United States Patent [19]

Andrews et al.

[11] 4,058,788
[45] Nov. 15, 1977

[54] DIFFERENTIAL PRESSURE TRANSDUCER

[75] Inventors: Allen Howe Andrews, Riverside; James Norman McPherson, Orange; John Thomas Burns, Jr., Mira Loma; John Matthew Hendrie, Riverside, all of Calif.

[73] Assignee: Bourns, Inc., Riverside, Calif.

[21] Appl. No.: 673,493

[22] Filed: Apr. 5, 1976

[51] Int. Cl.² .................................. H01L 10/10
[52] U.S. Cl. .................................. 338/42; 73/398 AR
[58] Field of Search ............... 338/36, 42; 73/398 AR, 73/407 R

[56] References Cited

U.S. PATENT DOCUMENTS

| | | | |
|---|---|---|---|
| 2,384,894 | 9/1945 | Curtis | 73/398 AR |
| 2,497,255 | 2/1950 | Brown | 73/407 R X |
| 2,772,569 | 12/1956 | Ruge | 73/398 AR |
| 3,162,795 | 12/1964 | Chernick | 73/407 R X |
| 3,822,596 | 7/1974 | Bonner | 73/407 R |
| 3,882,443 | 5/1975 | Mortia | 338/42 |
| 3,894,435 | 7/1975 | Shimada et al. | 73/398 AR X |
| 3,901,082 | 8/1975 | Lyon | 73/407 R |

Primary Examiner—C. L. Albritton
Attorney, Agent, or Firm—Paul H. Ware; William G. Becker

[57] ABSTRACT

First and second pressure sensitive diaphragm assemblies are mutually spaced at a substantially constant distance by a rigid member, whereby the diaphragm assemblies flex in unison in response to imposed pressure differentials. A longitudinally rigid but transversely flexible and resilient means such as a strut wire couples the diaphragm assemblies with a deflectable motion sensing means such as a cantilever beam bearing at least one strain gage. The coupling means flexingly accommodates to normal transverse deflection movements made by the motion sensing means, thereby significantly reducing both the strain on the motion sensing means and distortions in the readout obtained therefrom. In a preferred embodiment a hollow tube is employed to space the diaphragm assemblies. A motion sensing beam projects inwardly through an opening in the tube and is joined therein to a strut wire which extends inside the tube from one of the diaphragm assemblies. The strut wire flexes transversely when the diaphragm assemblies flex to a new position, permitting the beam to move in a normal arcuate path.

13 Claims, 3 Drawing Figures

DIFFERENTIAL PRESSURE TRANSDUCER

BACKGROUND OF THE INVENTION

This invention relates to differential pressure transducers, and more particularly to differential pressure transducers in which a pair of pressure sensitive diaphragm assemblies are constrained to flex in unison when subjected to a pressure differential the magnitude of which is to be measured.

Various differential pressure transducers are known in which a rod or other rigid structure connects a pair of pressure sensitive diaphragms and causes the diaphragms to flex in unison. When one of the two pressures forming the differential is applied to one of the diaphragms and the other pressure is applied to the other diaphragm, the diaphragms flex toward the lower pressure. As the magnitude of flexing can be correlated with the magnitude of the pressure differential, the latter quantity is obtained by measuring the distance through which the diaphragms move.

In one type of transducer, described in U.S. Pat. No. 3,882,443 to S. Mortia, dated May 6, 1975, a permeable core is attached to a rod which separates the diaphragms. A pair of electrical coils are disposed on each side of the core to form an inductance circuit. Movement of the core when the diaphgrams flex in response to a change in pressure differential alters the inductance of the circuit, thereby affording a method of measuring the new pressure differential.

Another approach that avoids extensive electric circuitry within the transducer is illustrated in U.S. Pat. No. 3,901,082 to L. Lyon, dated Aug. 26, 1975. In this patent a post is used to rigidly separate the diaphragms, and also deflects a leaf spring cantilever beam having strain gages mounted thereon when a differential pressure is applied to the diaphragms. The actual connection between the post and beams is accomplished by a metal stamping which is clamped to a flange on the post, the stamping having a tab which is brazed or otherwise fixed over its entire area to an end portion of the beam. While this approach has the advantage of relative simplicity of construction, it is still subject to improvement. The natural tendency of the cantilever beam when deflected is to move in an arc, but the fixed connection between the end of the beam and the metal stamping causes the end of the beam to move instead in a straight line path transverse to the unflexed beam plane. This in turn places an unnecessary stress on the beam and produces a large variation in the strain level at different points along the beam, making the location of the strain gage critical. Calibration problems can result if the gages are placed at locations where the beam strain is considerably more than would be the case if the beam was permitted to flex naturally, while placing the gages at a low strain location prevents efficient utilization of their full range.

SUMMARY OF THE INVENTION

The object of the present invention is the provision of a novel and improved differential pressure transducer to the type having a pair of pressure sensitive diaphragm assemblies which flex in unison and deflect a motion sensing means in response to a differential pressure applied across the assemblies.

Another object is the provision of such a differential pressure transducer in which a deflectable beam having strain gages mounted thereon is relieved of unnecessary stresses encountered in the prior art which are not required for measuring diaphragm movements.

Another object of the invention is the provision of a differential pressure transducer employing a deflectable motion sensing beam having strain gages mounted thereon in which the precise position of the strain gages is not critical to the accuracy or efficiency of the transducer.

Still another object is the provision of a differential pressure transducer which employs a deflectable motion sensing beam and is provided with a beam deflecting mechanism which accommodates to the natural flexing path of the beam.

An additional object is the provision of a differential pressure transducer which employs a pair of opposed pressure sensitive diaphragm assemblies and a deflectable motion sensing beam, in which the diaphragm assemblies are constrained to move together in unison by structure which is independent of the apparatus used to deflect the beam, thereby enabling the beam deflecting structure to be sufficiently flexible to accommodate to the natural beam movement.

These and other objects are accomplished in the present invention by the provision of a sensing cell having first and second pressure sensitive diaphragm assemblies. The assemblies are mutually opposed and spaced at a substantially constant distance from each other by rigid spacing means such that their flexing positions are determined by the differential between applied external pressures. A deflectable motion sensing means is coupled to the diaphragm assemblies by means of a longitudinally rigid but transversely flexible and resilient means which is adapted to deflect the motion sensing means in response to longitudinal flexing of the assemblies, while flexingly accommodating to transverse movements of the motion sensing means.

In a preferred embodiment the spacing means comprises a hollow tube secured at opposite ends to central portions of each diaphragm assembly while the motion sensing means comprises a cantilever beam having at least one strain gage mounted thereon. The beam is secured to the cell and extends transversely into the tube through an opening therein. A strut wire inside the tube is secured between the central portion of one of the diaphragm assemblies and the beam so as to deflect the beam as the diaphragm assemblies move in response to pressure changes. The strut wire is flexible in a direction transverse to the diaphragm motion and accordingly accommodates to the normal arcuate motion of the beam, but is sufficiently resilient to return to its initial shape when the diaphragm assemblies flex back to an initial position. Unnecessary stresses not associated with normal arcuate beam movements are thereby substantially avoided.

DESCRIPTION OF A PREFERRED EMBODIMENT

Figure 1:
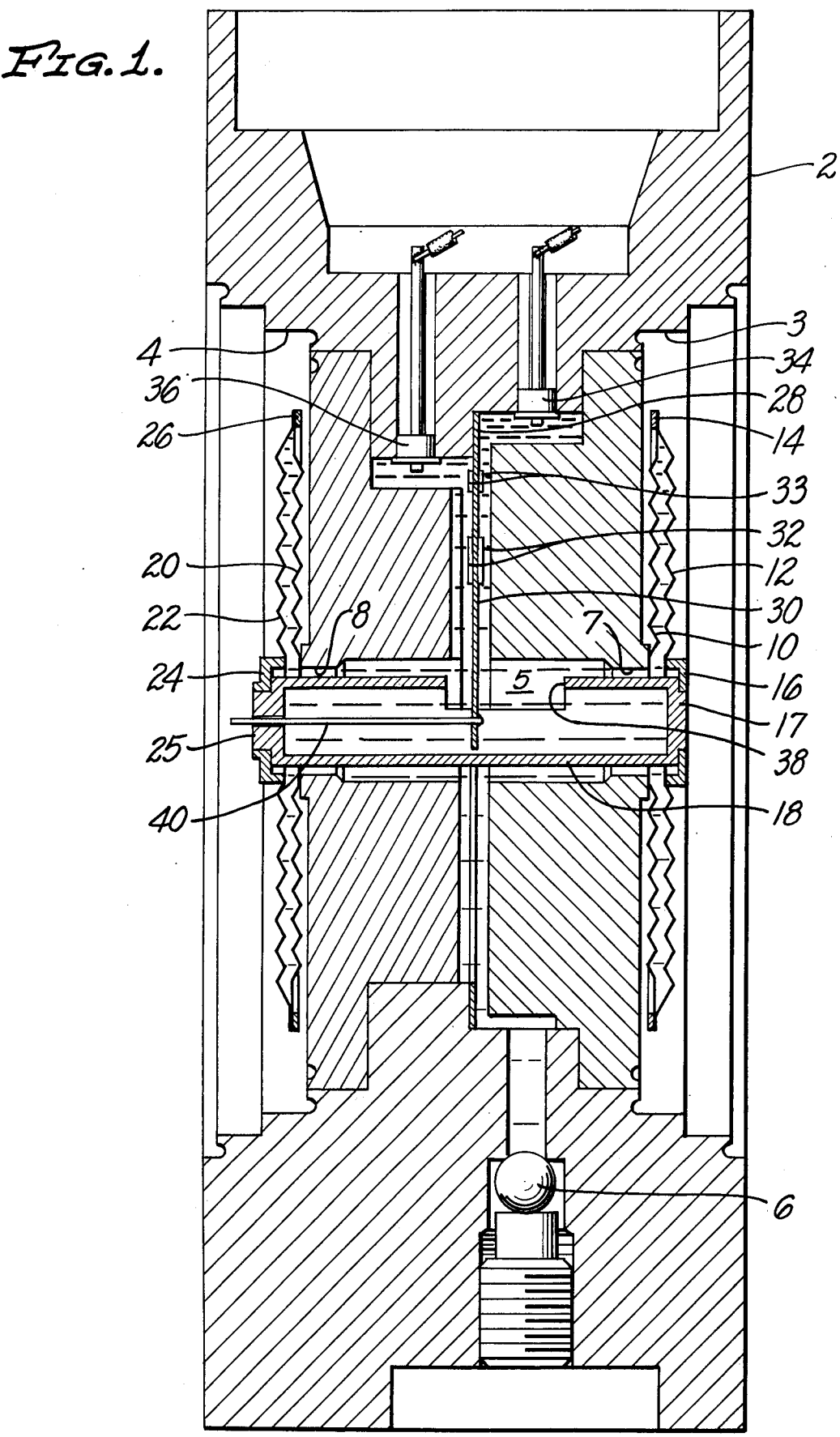
FIG. 1 is a sectional view of a differential pressure transducer constructed in accordance with the present invention.

Referring to FIG. 1, a differential pressure transducer is shown which includes a sensing cell 2 that houses or secures the transducer apparatus. Cell 2 has cavities 3 and 4 on each side which are respectively adapted to receive the two pressures forming the differential sought to be measured. An interior chamber 5 is normally filled with a non-compressible liquid such as oil from a ball seal 6 that enables the chamber to be flooded and then sealed. Chamber 5 extends to opposite sides of the cell between cavities 3 and 4 and forms opposed ports 7 and 8. A first diaphragm assembly is secured to the cell around the periphery of port 7. The assembly consists of an inner diaphragm 10 having a central opening which is welded at its edges to the sensing cell around port 7, an outer diaphragm 12 which is similar in construction to and nests with diaphragm 10, and an annular metal ring 14 to which the outer edges of both diaphragms 10 and 12 are welded. Diaphragms 10 and 12 are formed from a suitable material having a relatively high modulus of elasticity such as 17% chrome, 7% nickel precipitation hardenable (17-7 PH), cold worked stainless steel, and are preferably corrugated for enhanced responsiveness to pressure changes. An annular flange 16 is welded on one side to the central portion of outer diaphragm 12 and on its other side to the closed end 17 of a hollow cylindrical tube 18 which is rigidly formed from a metallic material and extends through chamber 5 to the other side of cell 2. A similar diaphragm assembly is provided on the other side of cell 2, including inner and outer diaphragms 20 and 22 which have central apertures welded respectively to the sensing cell around the periphery of port 8, and to one side of an annular flange 24. The other side of flange 24 is welded to the closed end 25 of tube 18 opposite to end 17, which tube ends in effect form the central portions of their respective diaphragms. An annular ring 26 is welded to the outer edges of both diaphragms 20 and 22.

Chamber 5 together with the described diaphragm and tube structure forms a closed oil filled compartment. The longitudinal position of tube 18 is determined by the flexed state of the diaphragms at either end, which in turn is determined by the pressures applied to the diaphragm assemblies. For example, assuming that a greater pressure is applied to left hand diaphragms 20 and 22 than is applied to right hand diaphragms 10 and 12, the left hand diaphragms will contract toward each other while the right hand diaphragms expand away from each other. The net effect is to move both of the diaphragm assemblies to the right, with tube 18 constraining the two diaphragms to move in unison. If the pressure on the left hand diaphragms is now decreased or the pressure on the right hand diaphragms increased, the diaphragm assemblies and tube 18 will shift back to the left. Diaphragm constructions other than the one shown could have been employed, such as single diaphragms on each side of cell 2. The construction shown, however, has the advantage of increasing the amount of tube movement for a given pressure differential and thereby increasing the sensitivity of the device, while reducing stress on the diaphragms for a given pressure differential. Should the pressure differential exceed a certain limit the adjacent diaphragms on the high pressure side will come together and nest, thereby preventing any further movement of tube 18 and in effect providing a convenient over-pressure safety device.

Figure 2:
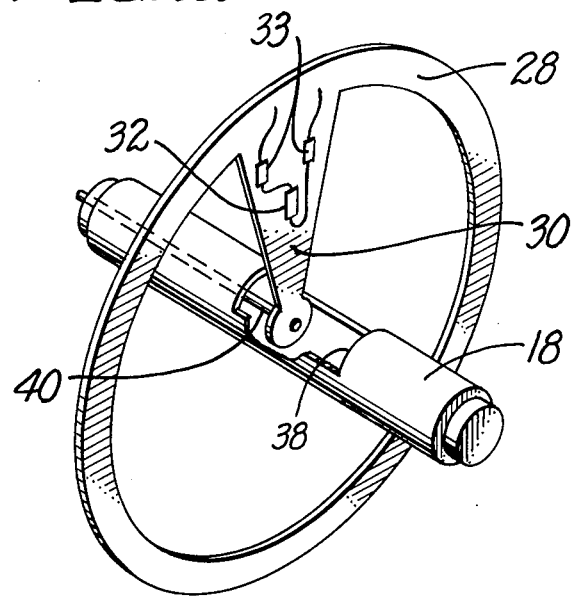
FIG. 2 is an enlarged perspective view of apparatus for spacing apart and sensing movement of the pressure sensitive diaphragm assemblies.

Flexing of the diaphragms in response to differential pressure changes is detected by a motion sensing mechanism shown in FIGS. 1 and 2. An outer ring 28 and deflectable cantilever beam 30 extending inwardly from the ring are formed by any suitable process such as chemical milling in a unitary construction from a metal sheet. Ring 28 is welded to an annular ledge on an inner wall of cell 2 surrounding and in a plane transverse to tube 18. Bonded to each side of beam 30 is a network comprising a strain gage 32 and two terminal pads 33. The strain gages are connected in a half bridge network, which in turn is connected to external conductors which extend into chamber 5 through high pressure terminals 34 and 36. Other strain gage networks could also be used, such as a full bridge circuit.

Beam 30 extends into the interior of tube 18 through an opening 38 in the tube wall. The end portion of the beam is connected to tube end 25 by means of a strut wire 40 which is inserted through openings in the tube end 25 and beam 30 and connected to each by welding or brazing. Strut wire 40 couples the diaphragms with beam 30 such that longitudinal movements of the diaphragms in response to differential pressure changes are transmitted to beam 30 by the strut wire and causes the beam to deflect. This in turn alters the resistivity of strain gages 32 such that the amount of beam deflection, and thereby the magnitude of the pressure differential, can be electrically sensed.

Figure 3:
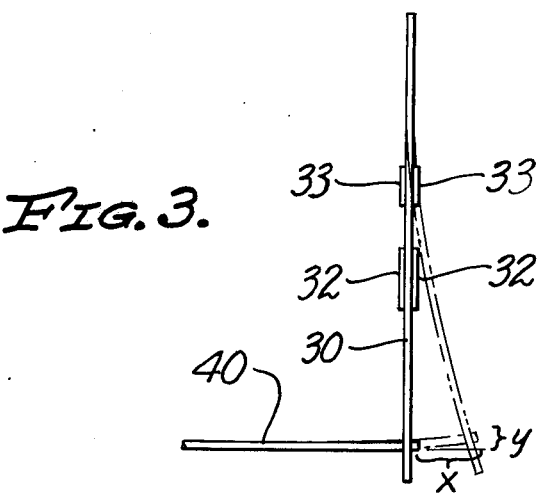
FIG. 3 illustrates a deflection of the motion sensing beam.

Strut wire 40 is substantially rigid in a longitudinal direction parallel to the axis of tube 18, but is resiliently flexible in the transverse direction. Thus when beam 30 is deflected by a longitudinal movement of the diaphragms, strut wire 40 flexes in a transverse direction as well as moving longitudinally with the diaphragms, thereby enabling beam 30 to bend in a natural arcuate path. Beam 30 is accordingly not forced to move in a straight line parallel to the diaphragm and tube movement. This feature is illustrated in FIG. 3, in which beam 30 and strut wire 40 are shown in an unstressed position in solid lines, and in dashed lines in a position following deflection of the beam. It is seen that, in addition to a longitudinal movement $x$, the arcuate path followed by the beam also results in a transverse movement $y$. Prior art devices which force the beam to move in a straight line path effectively eliminate the transverse portion of the beam deflection and in so doing increase the overall stress on the beam. In addition, the imposed stress is not uniform at different locations; the beam can be under tension at one end and under compression at the other end, with a null in the middle. This makes the placement of the strain gages critical. In the present invention, however, the beam stress is much more uniform for a given amount of deflection, and the location of the strain gages on the beam is correspondingly less critical.

A suitable material for strut wire 40 is 17-7 PH, cold worked stainless steel, about 0.01 inch (0.28mm) in diameter. This material produces a strut wire which is strong and rigid in the longitudinal direction while possessing good spring qualities in the transverse direction. Another suitable material for the strut wire is cold drawn 302 (American Iron and Steel Institute standard) stainless steel. It is preferable that the adjacent metallic portions of the beam, tube, and sensing cell be made of the same material as the strut wire, or at least from a material having substantially the same coefficient of thermal expansion, so that they all expand or contract by equal proportions when the operating temperature changes.

The described invention enjoys the advantage of the prior art in obtaining a rigid separation of pressure differential sensing diaphragms, but avoids the problems associated with deflecting a motion sensing beam along the same path as the diaphragm movements. While a particular embodiment of the invention has been shown and described, numerous additional modifications and variations are possible in light of the above teachings. It is therefore intended that the scope of the invention be limited only in and by the terms of the appended claims.

What is claimed is:

1. A differential pressure transducer, comprising:
    a sensing cell,
    first and second pressure sensitive diaphragm assemblies, each assembly comprising nested inner and outer diaphragms, held by said cell for longitudinal flexing when exposed to pressures external to said cell,
    means rigidly spacing at least portions of said diaphragm assemblies at a substantially constant distance, whereby the flexing positions of said assemblies are determined by the differential between the external pressures to which they are exposed,
    a deflectable motion sensing means comprising a cantilever beam secured near one end to said cell and having at least one strain gage mounted thereon to measure deflections of said beam;
    a longitudinally rigid but transversely flexible and resilient coupling means for coupling said diaphragm assemblies with said motion sensing means, comprising a strut wire secured between one of said diaphragm assemblies and said motion sensing means, wherein said beam is secured to said coupling means near its other end and said beam has an unflexed position substantially transverse to the unflexed position of said strut wire so as to move along a substantially arcuate path when deflected by said strut wire, and wherein said coupling means is adapted to deflect said motion sensing means in response to longitudinal flexing of said assemblies and to flexingly accommodate to transverse movements of said motion sensing means.

2. A differential pressure transducer, comprising:
    a sensing cell,
    first and second pressure sensitive diaphragm assemblies held by said cell in mutually spaced opposition for receiving external pressures,
    a rigid tube extending longitudinally and secured at its opposite ends to central portions of each of said diaphragm assemblies and thereby constraining said diaphragms to flex in unison,
    a deflectable motion sensing means adapted to produce an output signal indicative of the sensed motion, and
    a longitudinally rigid but transversely flexible and resilient means coupling said diaphragm assemblies with said motion sensing means, said coupling means being adapted to deflect said motion sensing means in response to longitudinal flexing of said assemblies, and to flexingly accommodate to transverse movements of said motion sensing means.

3. The transducer of claim 2, wherein said coupling means comprises a strut wire secured between a central portion of one of said diaphragm assemblies and said motion sensing means.

4. The transducer of claim 3, wherein said strut wire is positioned inside said tube, and said tube is provided with an opening for said strut wire to engage said motion sensing means.

5. The transducer of claim 4, wherein said central diaphragm assembly portions comprise terminal structures for said tube.

6. The transducer of claim 4, wherein said motion sensing means comprises a cantilever beam secured to said cell and having at least one strain gage mounted thereon to measure deflections of said beam.

7. The transducer of claim 6, wherein said beam projects through said tube opening and is engaged within said tube by said strut wire.

8. The transducer of claim 7, said beam having an unflexed position substantially transverse to the tube axis so as to move along a substantially arcuate path when deflected by said strut wire.

9. The transducer of claim 7, wherein said strut wire extends through an opening in said beam and is brazed thereto.

10. The transducer of claim 3, said strut wire being formed from a hard metallic material.

11. The transducer of claim 10, said strut wire being formed from 17-7 PH cold worked stainless steel.

12. The transducer of claim 11, wherein the diameter of said strut wire is approximately 0.28 millimeter.

13. The transducer of claim 2, wherein said sensing cell is filled with a non-compressible liquid.

* * * * *